United States Patent [19]
Haaland et al.

[11] Patent Number: 5,923,104
[45] Date of Patent: Jul. 13, 1999

[54] SINGLE CHANNEL DOUBLE-DUCT LIQUID METAL ELECTRICAL GENERATOR USING A MAGNETOHYDRODYNAMIC DEVICE

[75] Inventors: Carsten M. Haaland, Dadeville, Ala.; W. Edward Deeds, Knoxville, Tenn.

[73] Assignee: Lockheed Martin Energy Research Corporation, Oak Ridge, Tenn.

[21] Appl. No.: 08/874,517

[22] Filed: Jun. 13, 1997

Related U.S. Application Data

[63] Continuation-in-part of application No. 08/238,281, May 5, 1994, Pat. No. 5,637,935.

[51] Int. Cl.$^6$ ................................................. H02K 44/18
[52] U.S. Cl. .................................................................. 310/11
[58] Field of Search ..................... 310/11, 307; 417/50; 123/46 E; 324/93; 376/139; 60/595

[56] References Cited

U.S. PATENT DOCUMENTS

| | | | |
|---|---|---|---|
| 2,715,190 | 9/1955 | Brill | 310/11 |
| 2,977,050 | 3/1961 | Sparrow | 417/50 |
| 3,710,153 | 1/1973 | Barbacsy et al. | 310/11 |
| 4,381,463 | 4/1983 | Branover | 310/11 |
| 4,749,890 | 6/1988 | Houston | 310/11 |
| 4,824,329 | 4/1989 | Yamamoto et al. | 417/50 |

FOREIGN PATENT DOCUMENTS

| | | | |
|---|---|---|---|
| 86/06225 | 10/1986 | WIPO | H02K 44/24 |
| 88/05223 | 7/1988 | WIPO | H02K 44/08 |

OTHER PUBLICATIONS

Webster's II New Riverside University Dictionary, p. 704, 1984.

*Primary Examiner*—Nestor Ramirez
*Assistant Examiner*—B. Mullins
*Attorney, Agent, or Firm*—Morgan & Finnegan, L.L.P.

[57] ABSTRACT

A single channel double-duct liquid metal electrical generator using a magnetohydrodynamic (MHD) device. The single channel device provides useful output AC electric energy. The generator includes a two-cylinder linear-piston engine which drives liquid metal in a single channel looped around one side of the MHD device to form a double-duct contra-flowing liquid metal MHD generator. A flow conduit network and drive mechanism are provided for moving liquid metal with an oscillating flow through a static magnetic field to produce useful AC electric energy at practical voltages and currents. Variable stroke is obtained by controlling the quantity of liquid metal in the channel. High efficiency is obtained over a wide range of frequency and power output.

18 Claims, 3 Drawing Sheets

SINGLE CHANNEL DOUBLE-DUCT LIQUID METAL ELECTRICAL GENERATOR USING A MAGNETOHYDRODYNAMIC DEVICE

RELATED APPLICATIONS

This application is a continuation in part of U.S. application Ser. No. 08/238,281, entitled "DOUBLE-DUCT LIQUID METAL MAGNETOHYDRODYNAMIC ENGINE", filed May 5, 1994, now U.S. Pat. No. 5,637,935, which is incorporated by reference as if fully set forth herein.

This invention was made with Government support under contract DE-AC05-84OR21400 awarded by the U.S. Department of Energy to Lockheed Martin Energy Systems, Inc. and the Government has certain rights in this invention.

FIELD OF THE INVENTION

The present invention relates to a single channel double-duct liquid metal generator using a magnetohydrodynamic (MHD) device for use in a two cylinder engine and, more specifically, to a single channel double-duct liquid MHD device which includes a flow conduit network and drive mechanism for moving liquid metal through a magnet to produce electricity.

BACKGROUND OF THE INVENTION

Recent developments in liquid MHD systems have made them feasible for use in electric engines or areas in which there is no main power grid or the cost of delivery of electric power is high. They can also be used as mobile electric power generators. In general, a magnetohydrodynamic (MHD) system uses a liquid metal (LM) moving through a magnetic field to produce electricity.

A Hartmann duct 10, which is known in the art and is shown in FIG. 1, can be employed as a generator. The Hartmann principle is further set forth in "Steady Motion of Conducting Fluids in Pipes Under Transverse Magnetic Fields," J. A. Shercliff, *Cambridge Phil. Soc.*, Vol.49, 136–144 (1953). A Hartmann duct 10 is a rectangular conduit with insulating plates 20 on two sides perpendicular to the direction of an applied magnetic field. Conducting plates in the form of a negative electrode 22 and a positive electrode 23 are on the two remaining sides that are parallel to the magnetic field. Liquid metal flows through the Hartmann duct 10 in one direction. A standard Hartmann duct outputs direct-current electric power with numerical voltages typically on the order of a few on-thousandths part of the numerical value of the current in amperes. This volt-amperage ratio is not practical for usage in electrical devices. The MHD device of the present invention overcomes this deficiency.

PCT application WO 88/05223 to Sainsbury et al. teaches a Reciprocating Free Liquid Metal Piston Stirling Cycle Linear Synchronous Generator. This reference dismisses the idea of using MHD devices in generators and engines because the Hartmann duct, which is a single duct device, is inefficient and results in a low voltage, high current device which is not practical.

Sainsbury further dismisses MHD devices on the basis that they are not particularly efficient due to the relatively high resistivity of liquid metal, even liquid sodium, compared with solid copper. An examination of the theory of liquid metal MHD devices shows that the higher specific resistivity of liquid metal compared to that of copper can be easily compensated for by enlarging the duct so that the cross-sectional area of the flowing electric current multiplied by the specific resistivity of the liquid metal results in a total resistivity that can be as low or lower than that of a copper wire selected for a winding in a solid metal generator with the same output requirements. The current-carrying cross-sectional area of the MHD duct can be increased by either increasing the height (magnetic gap) or the length of the duct.

In addition, Sainsbury also dismisses MHD devices because of eddy currents which occur where the liquid metal enters and leaves magnetic field. The technique of eliminating these eddy currents, also called "end-zone shorting" or "end-current loops", has been solved in the past by inserting nonconducting vanes in the end zones that do not interfere with the flow of liquid metal. This technique has been described by Sutton, Hurwitz, and Poritsky in "Electrical and Pressure Losses in a Magnetohydrodynamic Channel Due to End Current Loops", IEEE Transactions, January 1962, Vol. 58, pp 687–689.

A further difficulty with typical Hartmann duct MHD devices, which is not addressed by Sainsbury, results from the magnetic field induced by the generated electric current. Referring to FIG. 1A, the electric current vector $\vec{j}$ is directed transverse to the liquid metal velocity vector $\vec{v}$ and transverse to the steady imposed magnetic field $\vec{B}_0$, according to the vector cross product $\vec{v} \times \vec{B}_0$ of the liquid velocity vector and the imposed magnetic field vector. The induced magnetic field $\vec{H}$ encircles the electric current flow according to the right-hand rule. Thus the induced magnetic field lines are directed parallel to the fluid flow, in a longitudinal direction. When the MHD electric current is large, the induced magnetic field causes unstable lateral pressures and vortices in the fluid flow. For Hartmann duct MHD devices generating useful power, the current is large, and it has been found to be necessary to eliminate these instabilities by "backstrapping." Backstrapping is accomplished by a heavy copper electrode which carries the current from one electrode of the Hartmann duct over the top of one of the insulating plates to the opposite electrode. The induced magnetic field due to the electric current in this strap is equal to and opposite the induced magnetic field due to the electric current in the liquid metal, thus effectively canceling the longitudinal magnetic field and eliminating instabilities. The MHD device in the present invention does not require backstrapping because the double duct configuration with counterflow liquid in adjacent ducts produces induced magnetic fields that exactly cancel each other.

Free-piston linear motion two-stroke engines having solid metallic alternators to generate electricity are disclosed in U.S. Pat. No. 4,876,991 to Galitello, Jr. However, this reference suffers reduction in fuel conversion efficiency at power outputs less than the maximum and the range of power output variation will be many times less than the liquid metal engine. This reference also uses a heavy solid metal plunger to generate electricity and must be suspended by bearings or flexible suspension. In a liquid metal device the need for bearings is eliminated because the moving material is liquid.

An example of a double duct liquid metal electrical generator using an MHD device is shown in U.S. Pat. No. 5,473,205 to Haaland, incorporated by reference herein. However, double-duct engines use two separate channels of liquid metal, and therefor, require four combustion chambers, four combustion pistons, four magnetic couplings and four liquid metal pistons. This results in a need for synchronization devices between the two liquid metal channels.

SUMMARY OF THE INVENTION

It is an object of the present invention to provide an AC generating single channel double-duct liquid metal MHD generator.

Another object of the present invention is to provide a two cylinder engine having a single channel liquid metal electrical generator using an MHD device, the single channel looped around the far side of an MHD device to form a double-duct contra-flowing liquid metal MHD generator.

A further object of the present invention is to provide an apparatus for maintaining operation of the engine during misfires.

A still further object of the present invention is to provide a fail-safe electrical load apparatus for the generator.

Yet a further object of the present invention is to eliminate the need for synchronization devices in the MHD generator.

According to the present invention, the foregoing and other objects and advantages are attained by providing an MHD generator which includes a channel looped on one side of the MHD device. Both ends of the channel are passed through the MHD device forming a double-duct configuration. Liquid metal flows in the channel. An apparatus is provided for imparting reciprocating motion in the liquid metal in the channel. This apparatus can be a combustion cylinder having oscillating free pistons, or other similar device. An apparatus for imposing a magnetic field is also provided.

The MHD device includes a rectangular conduit having insulating plates on two sides perpendicular to the direction of an applied magnetic field, electrodes located on two other sides of the rectangular conduit, a magnet surrounding the conduit, a transformer coupled to one side of the magnet parallel to the electrodes and a bus bar coupled to a second side of the magnet opposite the first side.

Additionally, an adjusting apparatus adjusts the quantity of liquid metal in the channel. Addition of liquid metal to the channel reduces the free space available for motion and thus reduces the piston stroke. Reduction of liquid metal to the channel increases the free space available and thus increases the piston stroke. The addition of liquid metal to the channel reduces the free space available for motion and thus reduces the piston stroke. Reduction of liquid metal to the channel increases the free space available and thus increases the piston stroke. The adjusting apparatus can include a bellows and a selsyn motor which drives the bellows. An AC power apparatus, which includes an electronic control circuit coupled to the magnet and a capacitor circuit connected to the electronic circuit to provide backup power, is employed to maintain motion of the moving system through a cycle or two in the event of a misfire. If a misfire occurs, the central computer will recognize the loss of power by fluid velocity detectors, and will instantly switch and control the capacitors to provide a current through the liquid metal in the opposite direction of the current that would be generated under normal operation. This current, interacting with the imposed stationary magnetic field, will cause the MHD device to act as a pump, providing a body force on the liquid which will drive the moving system into position for the succeeding compression and ignition phases of the cycle, using the piston adjacent to the piston which misfired.

An apparatus, such as an MHD pump, is provided for returning excess liquid metal back to a liquid metal reservoir which may result from seepage of liquid metal past the pistons. An electrical load is also provided in the event that an external load suddenly ceases. The electrical load prevents the free running piston assembly from striking the cylinder head in the event of external load failure.

The above features of the present invention provide the advantages that the need for two separate channels of liquid metal is eliminated. In addition, only two combustion chambers, two combustion pistons, two magnetic couplings and two liquid metal pistons are required instead of four as in a double-duct system. Because only one channel for the liquid metal is provided, the need for synchronization devices between two liquid metal channels as in the prior art, is eliminated and the cross-sectional area of the channel is larger for a given power output. This reduces viscous dissipation losses and increases efficiency. These reductions also reduce the cost, complexity and total mass of the device and increase the reliability of the device because there are fewer components. Vibration is also not increased because equal masses of liquid metal, pistons and connecting devices are accelerated in opposite directions.

Additional objects, advantages and novel features of the invention will become apparent from the following detailed description, which, taken in conjunction with the attached drawings, discloses preferred but non-limiting embodiments of the invention.

BRIEF DESCRIPTION OF THE DRAWINGS

FIG. 1A is a diagram showing the spatial relationships of the magnetic field vector, the conducting fluid velocity vector, and the induced electrical current vector.

FIG. 3, including

DESCRIPTION OF THE PREFERRED EMBODIMENTS

Figure 1:
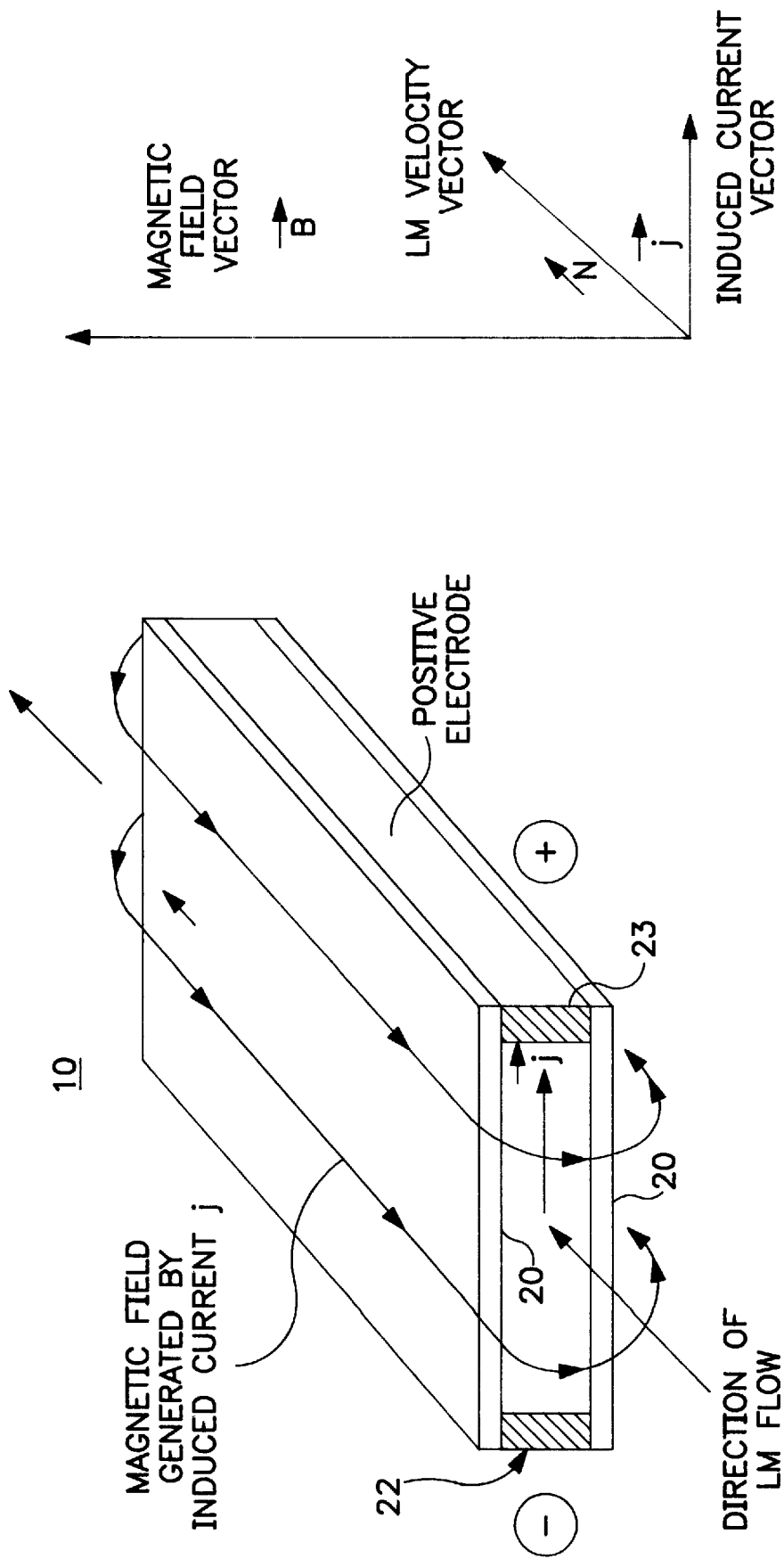
FIG. 1 is a diagram of a conventional Hartmann duct.
Figure 2:
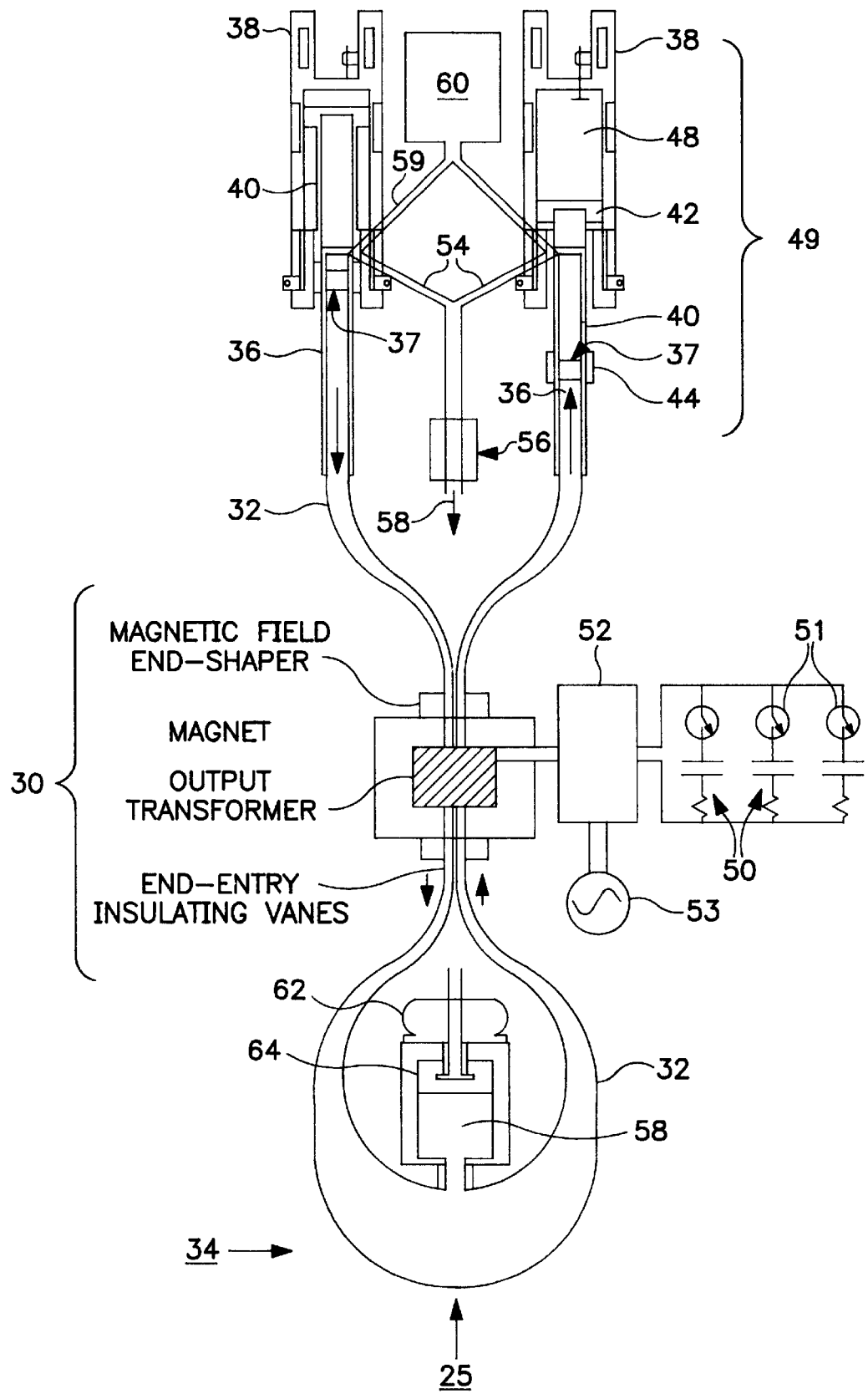
FIG. 2 is a diagram of a single channel double-duct liquid metal electrical generator using an MHD device according to the present invention.

FIG. 2 of the present invention shows a single channel double-duct liquid metal generator 25 using a magnetohydrodynamic device 30 (hereinafter referred to as an "MHD device") according to the present invention. Referring to FIG. 2, a single liquid metal channel 32 is employed. The liquid metal channel 32 forms a loop 34 around one end of the MHD device 30. The MHD device 30 employs the principles of a Hartmann duct but is not a Hartmann duct. The channel 32 is then inserted into the MHD device 30 such that both ends of the channel 32 are passed therethrough forming a double-duct configuration. Therefore the liquid metal flowing through the channel 32 in the MHD device 30 flows in two directions which are opposite from each other (counter-flowing) as indicated by the directional arrows, in a manner similar to the double-duct system recited in U.S. Pat. No. 5,473,205 to Haaland.

The ends of the channel 32 on the side of the MHD device 30 opposite the looped side emerge from the MHD device 30 and separate. Each end of the channel 32 is inserted respectively into liquid metal pumping cylinders 36 which are connected to combustion cylinders 38. Motion is imparted to the liquid metal in the liquid metal channel 32 by the liquid metal pumping cylinders 36. The combustion cylinders 38 each include a slotted cylinder 40 which connects a combustion piston 42 with the liquid metal piston 36 by way of a magnetic coupling 44. The hollow shank (slotted cylinder) 40 slidably engages an end portion of the channel 32. The combustion pistons 42 in each combustion cylinder 38 for each channel 32 causes the liquid metal in the channel 32 to reciprocate synchronously by, for example, a linear free-piston internal combustion engine as shown. During operation, one piston assembly 49 (including the combustion piston 42, slotted cylinder 40, magnetic coupling 44, and liquid metal piston 37) is forced down by expanding gasses of combustion. The liquid metal, which is incompressible, forces the other piston assembly up to accomplish flushing of exhaust gasses from the combustion cylinder 38 followed by compression of the fuel-air mixture in the combustion chamber 48. Because the liquid metal can only push and cannot exert a pulling or restraining force on the free-moving piston assembly 49, kinetic energy of the assembly 49 is controlled such that the upward movement is stopped when the desired compression of the fuel-air mixture is obtained. That is, the kinetic energy of the free-moving piston assembly 49 must not exceed the work required to compress the fuel-air mixture to the desired pressure/temperature. This control is obtained by controlling the amount of fuel injected at the beginning of the cycle and controlling an electrical load to an external circuit of the MHD generator 25. Controlling the amount of fuel injected limits the accelerating forces to the moving system by limiting the amount of kinetic energy available for converting to mechanical energy. Controlling the electrical load affects the retarding forces on the moving system, as imposed on the liquid metal, in motion through the magnetic field of the MHD device 30. An increase in the external electrical load imposes more drag on the liquid metal motion. If the momentary operation of the application of the device cannot provide a necessary momentary external loop, ultra-capacitors 50 may be electronically switched by electronic switch 51 into the circuit to provide such a load by way of an electronic circuit control 52. Further, an AC power output 53 is connected to the electronic circuit control 52 to receive AC power from the MHD device 30.

The ultra-capacitors 50 also provide impulses to the movement of the liquid metal by way of the MHD device 30 in the event of misfire. Motion and pressure sensors (not shown) will signal a computer (not shown) when a misfire occurs causing the computer to switch out the external load by way of the electronic circuit control and switch in one or more of the ultra-capacitors 50 to power the electrodes of the MHD device 30 to act as a pump. This gives sufficient kinetic energy to the liquid metal in the piston assembly to compress the fuel-air mixture in the next cycle to continue the operation of the engine. If this action were not provided, the engine would die with a single misfire. The ultra-capacitors 50 may also serve to store energy generated by an electric motor propulsion unit (not shown) during braking of an automotive vehicle if the motor is so configured. The energy stored will increase the overall efficiency of the vehicle. The ultra-capacitors 50 are very large capacity capacitors capable of storing or releasing up to 1 MW per cubic foot.

During operation, some of the liquid metal will seep around the liquid metal piston 37. A liquid metal seepage overflow pipe 54 is located at the top of each liquid metal pumping cylinder 36. This overflow pipe 54 slopes downward, as shown in FIG. 2, to a one-way valve and an MHD pump 56. The overflow pipe and MHD pump 56 should operate in a vertical or near vertical position so that gravity will pull the excess liquid metal down the overflow seepage pipes 54. The one-way valve prevents liquid metal from flowing from a liquid metal reservoir 58 into the liquid metal pumping cylinders 36. The MHD pump 56 forces the liquid metal into the reservoir 58 during the low pressure phase of the pressure oscillations. To prevent the liquid metal pistons 37 from sucking the overflow seepage liquid metal back into the liquid metal pumping cylinders 36, the overflow seepage pipe 54 is split with a branch pipe 59 going upward to an argon gas buffer chamber 60. The argon gas buffer chamber 60 is filled with argon or other pressurized inert gas to prevent a vacuum from forming in the system. The diameter of the branch pipe 59 is large to permit free flow back and forth as the liquid metal pistons 37 oscillate in the liquid metal pumping cylinders 36.

The liquid metal reservoir 58 is attached to the liquid metal channel 32 on the looped side of the channel 34. The reservoir 58 can be altered in storage volume by a selsyn motor 62 which squeezes a bellows 64. Selsyn motors 62 are known and used in the art. The bellows 64 contracts and forces additional liquid metal into the channel 32, or alternately, the bellows 64 extends, allowing liquid metal from the channel 32 to expand into the reservoir 58. When additional liquid metal is forced from the reservoir 58 into the channel 32 by squeezing the bellows 64, the motion of the liquid metal pistons 37 is restricted to a shorter stroke. Conversely, when the bellows 64 is extended, the driving pressure of the liquid metal pistons 37 forces the liquid metal into the reservoir 58 and the liquid metal pistons 37 are free to oscillate through a longer stroke. Therefore, the liquid metal in the channel 32 can be adjusted while the device is in operation. Because the selsyn motor 62 drives the bellows 64, adjustment can be made within a few operating cycles, i.e., in less than a second of time. In addition, the operating stroke is continuously variable over an unlimited range, restricted only by means for producing the stroke.

When not operating, the device should preferably stand vertically otherwise gravity will cause seepage of liquid metal around the liquid metal pistons 37 into the portion of the liquid metal pumping cylinders 36 above the liquid metal pistons 37. When the engine is turned off, energy from a storage battery (not shown), or from the ultracapacitors, is used to drive the selsyn motor 62 of the reservoir 58 to squeeze liquid metal into the channel 32 and thus move the liquid metal pistons 37 up to a minimum stroke position for easy starting. A position maintainer (not shown) engages the magnetic coupling 44 on the liquid metal piston 37 to prevent the piston assembly 49 from gradually sinking down into the liquid metal while idle. If the device does not stand vertically when not operating, battery starter action can remove the excess liquid metal above the liquid metal piston 37. This occurs by oscillating the liquid metal pistons 37 back and forth a few times without fuel injection or ignition until the excess liquid metal at the top of the liquid metal pistons 37 has been ejected through the overflow seepage pipes 54. The excess liquid metal is then pumped by the battery operated MHD pump 56 into the liquid metal reservoir 58. It should be noted that a jacket containing argon or other inert gas (except nitrogen because it contains water vapor) should surround all tubing and pipes in the system to prevent oxygen from getting into the system and forming an oxide on the walls of the tubing. The oxide build-up can lead to explosions. An alternative is to gold plate the outside of the tubing and pipes in the system for the same reason.

The MHD device 30 will now be described with particularity with respect to FIG. 3, including FIGS. 3A and 3B. FIG. 3A is an isometric end view of an MHD device 30 according to the present invention. FIG. 3A shows a rectangular conduit 70 having two liquid metal ducts 72 with insulating plates 74 on either side of channel holes 76 and between the two channels. The insulating plates 74 are perpendicular to a direction of an implied magnetic field $\vec{B}_0$. Electrodes 78 are located on the other two sides of the rectangular conduit 70 that are parallel to the magnetic field $\vec{B}_0$. A magnet 80 is provided which surrounds the rectangular conduit 70. A transformer 82 is coupled to a first side of the magnet 80 parallel to the electrodes 78 and a bus bar 84 is coupled to a second side of the magnet 80 parallel to the electrodes 78 and opposite the first side. As shown, liquid metal flows in opposite directions in the channels 32.

Figures 3A, 3B:
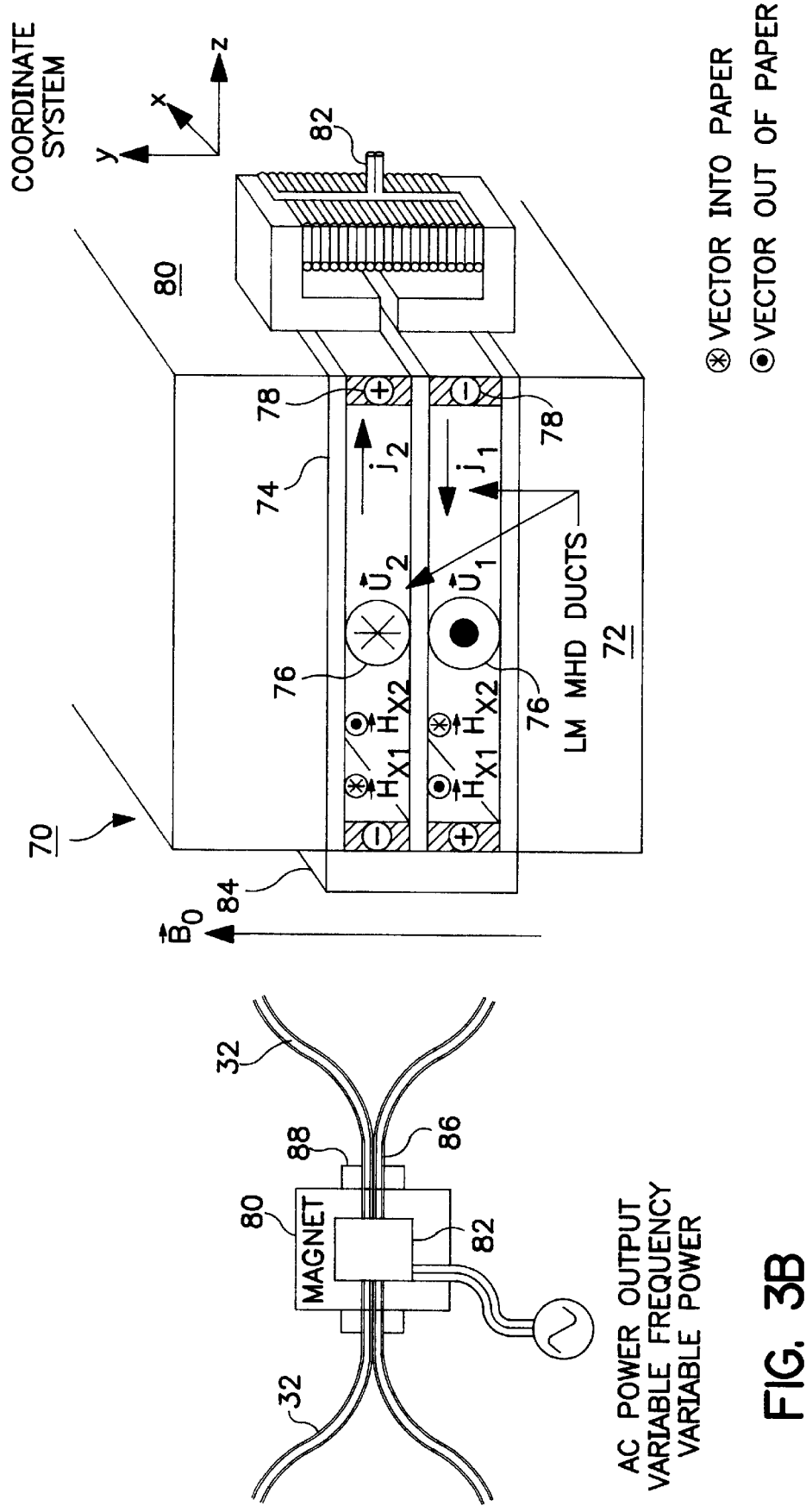
FIGS. 3A and 3B, is an isometric end view and a side view, respectively, of the MHD device used in the liquid metal electrical generator shown in FIG. 2.

FIG. 3B is a side view of the double layer contra-flowing liquid MHD device 30. The side view shows the side with the output transformer 82 connected to the magnet 80. The output transformer 82 is then connected to the electronic control circuit 52 as shown in FIG. 2. End entry insulating vanes 86 are provided around each side of the channel as it enters and exits the MHD device 30 and a magnetic field end shaper 88 surrounds each end entry insulating vane 86. Because the channels are stacked as shown in FIG. 3A fluid in the top portion of the channel flows in a direction opposite fluid in the bottom portion of the channel. This stacking allows current to be carried from one of the electrodes 78 over the top of the center insulating plate 74. The electric current vector $\vec{j}$ in each duct is directed transverse to the liquid metal velocity vector $\vec{u}$ and transverse to the steady imposed magnetic field $\vec{B}_0$, according to the vector cross product $\vec{u} \times \vec{B}_0$ of the liquid velocity vector and the imposed magnetic field vector. The induced magnetic field $\vec{H}$ encircles the electric current flowing according to the right-hand rule. Thus, the induced magnetic field line vectors from electric current in each duct are directed parallel to the fluid flow, in a longitudinal direction, and in opposition to each other. Thus, the longitudinal magnetic fields from the upper and lower channels tend to cancel each other outside the double-duct. Further, because there are two liquid metal ducts 72, with liquid metal flowing in opposite directions and sharing a common static magnetic field, the emf is doubled. The end entry insulating vanes 86 can be inserted into both the entry and exit sides of the liquid-metal ducts 72. The end entry insulating vanes 86 are longitudinally disposed parallel to each other so as not to restrict the flow of liquid metal therethrough. The end entry insulating vanes 86 prevent the generated electric current near the ends of the ducts 72 from circulating back through the portions of the liquid metal where there is no magnetic field to force the electric current in the preferred direction. The electrical resistance in the path through the liquid metal near the end entry insulating vanes 86 must be much greater than the resistance through an external load (not shown). The number and length of end entry insulating vanes required is determined on a case by case basis. That is, if the engine is large, the end entry insulating vanes are larger and there are more of them than if the engine is small.

The magnetic field end shaper 88 may be used in conjunction with the end entry insulating vanes 86. The magnetic field end shapers 88 are suitably shaped permanent magnets which have a dual purpose. First, they augment the action of the end entry insulating vanes 86 in reducing end-running of the generated electric current in the ends of the main current stream within the liquid metal ducts 72. Second, they facilitate the development of laminar magnetohydrodynamic boundary layers in the liquid metal flow in duct entrance regions.

The liquid metal in the liquid metal ducts 72 oscillates back and forth within the MHD device 30 such that the interaction with the magnetic field produces an alternating current output at the transformer 82. The transformer 82 steps up the voltage output and reduces the current to practical levels. Because the fluid in the channel is flowing in opposing directions, the induced electric current vectors $\vec{j}_1$ and $\vec{J}_2$ are directed in opposing directions. Because the electric current flows in opposing directions, the current from one duct is connected to the current in the adjacent duct by a bus bar at one side of the device, and the output electrodes 78 are on the opposite side of the device as shown in FIG. 3A. The electrodes 78 feed directly into a single turn primary coil of the transformer 82 which becomes an integral part of the generator. This output is then transformed into a voltage and current suitable for application to a liquid metal engine.

It can be shown that the power output P of this device is approximately $$P \approx Cf^2S^2 \qquad (1)$$

where C is a constant, f is the frequency at which the liquid metal oscillates and S is the stroke length. If the device is used as an electric generator for which the frequency output must remain constant, the variable stroke length capability is sufficient to produce a wide range of power output. That is, if the stroke length varies from a minimum of ⅓ the cylinder diameter to a maximum of 3 times the cylinder diameter, the maximum output will be 81 times the minimum power output. However, this power output range is limited by other factors. These factors are discussed below with respect to a constant frequency device, i.e., a device that must maintain constant frequency, such as an electric generator for residential or commercial use.

In a constant frequency device, the quantity of fuel-air mixture to be compressed must be increased as the stroke is increased. The compression ratio increases as the stroke length increases because the velocity of the liquid metal pistons 37 must increase to maintain frequency. The kinetic energy increases as the square of the velocity. As the compression ratio increases, the peak temperature of the fuel-air gas mixture just before ignition increases due to additional internal work done by compression. When the temperature reaches the spontaneous ignition temperature of the mixture, only a small additional increase in stroke length is allowable. This additional stroke is determined by how much preburning is desired before the top-dead-center of the piston assembly movement is reached. This stroke length limitation, imposed by the requirement of equality between internal work of compression and the kinetic energy of the free-moving piston assembly, can be extended by reducing the temperature of the fuel-air mixture (which increases the density of the mixture) and by increasing the pressure of the input fuel-air mixture by using various devices such as a conventional Roots blower or turbine compressor. Stroke length, and therefore the useful power range, can also be increased by changing the equivalence ratio (the ratio of the actual fuel-air ratio to the stoichiometric ratio), and/or by using a fuel having a higher spontaneous ignition temperature such as compressed natural gas rather than gasoline. Taking these factors into consideration, the maximum power of the device at a constant frequency may be adjusted up to a range of approximately 20–40 times the minimum power.

Where both frequency and stroke are varied in a motor vehicle device, including cars, trucks, busses, train engines, self-propelled marine vessels of all types and military vehicles such as tanks, troop carriers, etc., power output becomes more complicated. That is, for example, if the stroke is increased it does not necessarily follow that the quantity of fuel-air mixture must be increased as in constant frequency devices. The vehicle may be climbing a hill for which increased torque but lower speed is required. If that is the case, the stroke is increased and the frequency is reduced. Where both frequency and stroke are varied, the upper limit of the compression ratio is still determined by the spontaneous ignition temperature of the fuel-air mixture as described above for a constant-frequency application. To maintain a compression ratio the stroke must be increased if the frequency is decreased, and vice versa. This relationship arises from the principle that the internal work accomplished in compressing the gas must be equal to or nearly equal to the kinetic energy of the moving piston assembly and the liquid metal located above the liquid metal piston 37 at the beginning of the compression stroke.

Different methods of ignition of the fuel-air mixture may be chosen for different ranges of compression ratio. For example, spark ignition may be chosen for a compression range of approximately 8–12, glow-plug self-ignition for a compression range of 12–26, and compression ignition for a compression range from 26 on up, depending on the fuel-air ratio, the fuel-air input temperature and the type of fuel. Experimental engines have been developed that switch from spark-ignition to compression ignition. The benefits of the operation of this type of engine, a Compression Ignition Homogeneous Charge (CIHC) engine, may be extended to the entire range of compression ratio if the input fuel-air mixture is preheated before injection for the lower compression ratios. This makes the liquid metal MHD generator of the present invention feasible for various types of engines. It should be noted, however, that liquid metal may not be feasible in areas of cold weather because the liquid metal will become solid at its freezing point. To overcome this problem, a small heater, which can be battery operated, can be used for melting the liquid metal in cold weather situations. An alternate solution is to use a liquid metal with a lower melting point. For example, the addition of a small fraction of cesium to sodium-potassium liquid metal will lower the melting point below any normal temperatures, even in Arctic regions.

As noted above, the features of the present invention provide the advantages that the invention eliminates the need for two separate channels of liquid metal. That is, only two combustion chambers, two combustion pistons, two magnetic couplings and two liquid metal pistons are required. This reduces the complexity and total mass of the device, eliminates the need for synchronization devices between the two liquid metal channels, reduces the cost and increases the reliability of the device.

In addition, the single channel is stacked in the MHD device to a obtain a double-duct configuration with opposing and alternating directions of flow of liquid metal therein. The polarities of the electric currents generated by the channels are always in opposition to each other. This reverse stacking allows the emfs to be connected in series at a first side of the ducts by using a bus bar 84 and at a second opposite side of the ducts, and the summed emfs and common current can be fed directly into the primary turn of a transformer 82 that is an integral part of the channel. Because of the alternating opposing directions of liquid flow in the double-duct through a common magnetic field, alternating electrical output is generated, enabling the transformer 82 to convert the almost useless output of the standard Hartmann duct, which as noted above may be thousands of amperes at only a few volts, to practical current voltages. The attachment of a transformer 82 directly to one side of the double-duct reduces the self-inductance of the device to minimum levels.

Further, the liquid metal engine incorporates a sliding port in the combustion chamber to accommodate a variation in location of the exhaust port. Thus, the operating stroke of the liquid metal MHD generator is not restricted or limited by any mechanical requirements within the generator itself. The operating stroke is continuously variable over an unlimited range, restricted only by the means which produces the stroke.

This invention can be used as a vehicular power plant to provide primary electrical power for an electric propulsion motor such as developed by Delco for General Motor's Impact vehicle. Because of the variable-power/variable-frequency capability intrinsic to a linear alternator engine, no transmission or power inverter is required. The invention may also be used as a power plant for remote facilities, homes, villages or towns that are not connected to a main power grid. The variable stroke will allow matching of the power output to the diurnal variation of the power requirements, thus eliminating the need for expensive and short-lived energy storage devices such as batteries and fly wheels. Further, where delivery of electrical power to residences, commercial buildings and industrial plants is much higher per unit energy than delivery of natural gas, the engine generators may be used to consume natural gas to provide electricity with considerable monetary savings.

While advantageous embodiments have been chosen to illustrate the subject invention, it will be understood by those skilled in the art that various changes and modifications can be made herein without departing from the scope of the invention as defined by the appended claims.

What is claim is:

1. A magnetohydrodynamic (MHD) generator comprising:
    means for applying a magnetic field;
    a channel having an electrically conductive fluid flowing therein, said channel including:
        a first portion disposed in said magnetic field containing electrically conductive fluid flowing in a first direction;
        a second portion disposed in said magnetic field containing electrically conductive fluid flowing in a second direction;
        a connecting portion connecting said first portion and said second portion of said channel;
    means for imparting reciprocating motion in said electrically conductive fluid contained in said channel; and
    means for outputting an electric current generated by the interaction between said magnetic field and said electrically conductive fluid flowing through said first and second portions of said channel.

2. The magnetohydrodynamic generator according to claim 1, wherein said means for applying a magnetic field comprises a magnetohydrodynamic device in which said first and second portions of said channel are passed therethrough forming a double-duct configuration.

3. A magnetohydrodynamic generator according to claim 2, wherein said magnetohydrodynamic device comprises:
    a rectangular conduit having insulating plates on two sides thereof perpendicular to a direction of an applied magnetic field;
    electrodes located on two other sides of said rectangular conduit that are parallel to the applied magnetic field;
    a magnet surrounding said rectangular conduit;

a transformer coupled to a first side of said magnet parallel to said electrodes; and a bus bar coupled to a second side of said magnet parallel to said electrodes and opposite said first side.

4. A magnetohydrodynamic generator according to claim 3, wherein said means for imparting reciprocating motion in the liquid metal comprises combustion cylinders connected to said channel.

5. A magnetohydrodynamic generator according to claim 4, wherein said combustion cylinders comprise first and second oscillating free pistons, said first and second oscillating free pistons respectively driving said electrically conductive fluid in an end of said first portion of said channel and an end of said second portion of said channel.

6. A magnetohydrodynamic generator according to claim 5, further comprising adjusting means for adjusting the quantity of the liquid metal in said channel.

7. A magnetohydrodynamic generator according to claim 6, wherein said adjusting means comprises:

a bellows; and a selsyn motor coupled to said bellows for driving said bellows.

8. A magnetohydrodynamic generator according to claim 7, further comprising power means for supplying AC power to said MHD device during engine misfires.

9. A magnetohydrodynamic generator according to claim 8, wherein said power means comprises:

an electronic control circuit coupled to said magnet; and an ultra-capacitor circuit coupled to said electronic control circuit.

10. The magnetohydrodynamic generator according to claim 2, wherein said electrically conductive fluid is a liquid metal.

11. The magnetohydrodynamic generator according to claim 10, wherein said first direction is opposite to said second direction.

12. The magnetohydrodynamic generator according to claim 11, wherein said connecting portion of said channel is U-shaped.

13. A magnetohydrodynamic (MHD) generator comprising:

a channel having a first portion disposed in a magnetic field and a second portion disposed in said magnetic field, said first and second portions connected by a connecting portion of said channel external to said magnetic field, said channel having an electrically conductive fluid flowing therein;

a magnetohydrodynamic device generating an electric potential from the interaction of said electrically conductive fluid and said magnetic field, both said first and second portions of said channel passing through said magnetohydrodynamic device forming a double-duct configuration;

combustion cylinders connected to said channel for imparting reciprocating motion in said electrically conductive fluid contained in said channel;

a magnet surrounding said magnetohydrodynamic device for applying said magnetic field; and adjusting means for adjusting the quantity of liquid metal in said channel.

14. A magnetohydrodynamic generator according to claim 13, wherein said magnetohydrodynamic device comprises:

a rectangular conduit having insulating plates on two sides thereof perpendicular to a direction of an applied magnetic field, said permanent magnetic surrounding said rectangular conduit;

electrodes located on two other sides of said rectangular conduit, parallel to the applied magnetic field;

a transformer coupled to a first side of said magnet parallel to said electrodes; and a bus bar coupled to a second side of said magnet parallel to said electrodes and opposite said first side.

15. A magnetohydrodynamic generator according to claim 14, wherein said adjusting means comprises:

a bellows; and a selsyn motor coupled to said bellows for driving said bellows.

16. A magnetohydrodynamic generator comprising:

a magnet generating a magnetic field;

a channel having an electrically conductive fluid flowing therein, said channel including a first portion disposed in said magnetic field having said electrically conductive fluid flowing in a first direction therein, said channel including a second portion disposed in said magnetic field having said electrically conductive fluid flowing in a second direction therein;

an engine imparting reciprocating motion in said electrically conductive fluid contained in said channel; and a transformer outputting an electric current generated by the interaction of said magnetic field and said electrically conductive fluid flowing through said magnetic field in said first and second portions of said channel.

17. The magnetohydrodynamic generator of claim 16, wherein said first direction is opposite to said second direction.

18. A method for generating an electric current, comprising:

applying a magnetic field;

driving electrically conductive fluid through a first portion of a channel in a first direction, said first portion disposed in said magnetic field;

driving electrically conductive fluid through a second portion of said channel in an opposite direction to said first direction, said second portion disposed in said magnetic field;

receiving an electric current from said first and second portions of said channel, said current generated by the interaction of said magnetic field with said electrically conductive fluid flowing through said first and second portions of said channel.

* * * * *